Figure 1:
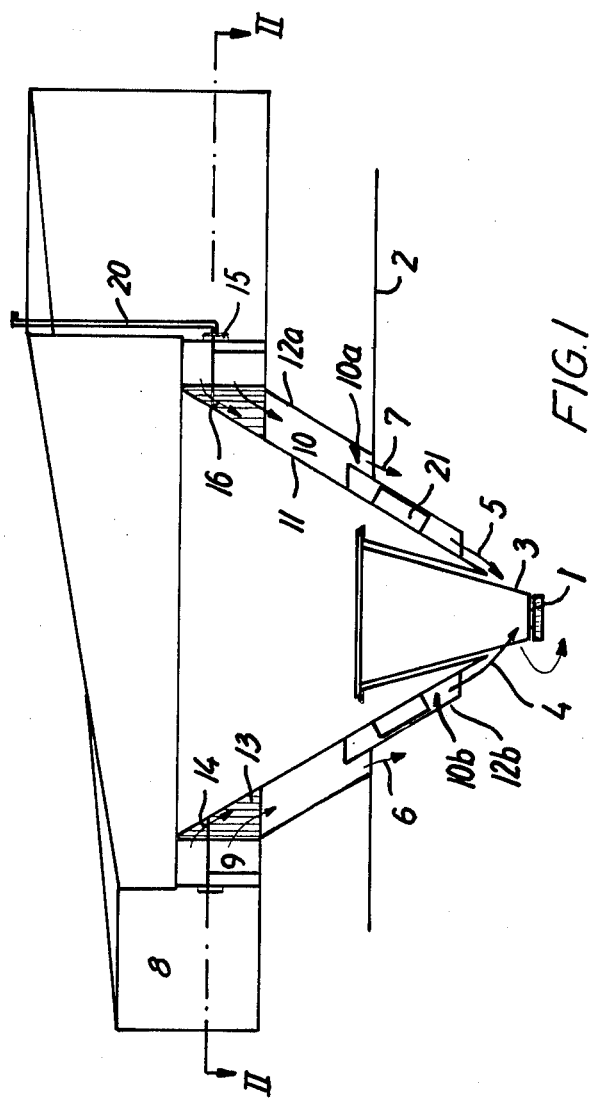

United States Patent [19]

Larsson et al.

[11] 4,226,603
[45] Oct. 7, 1980

[54] GAS DISTRIBUTION DEVICE FOR THE SUPPLY OF A PROCESSING GAS WITH ADJUSTABLE FLOW DIRECTION TO AN ATOMIZING CHAMBER

[75] Inventors: Finn H. Larsson, Tåstrup; Christian Schwartzbach, Malov, both of Denmark

[73] Assignee: A/S Niro Atomizer, Soborg, Denmark

[21] Appl. No.: 63,885

[22] Filed: Aug. 3, 1979

[30] Foreign Application Priority Data

Aug. 17, 1978 [DK] Denmark .............................. 3639/78

[51] Int. Cl.² ............................................ B01D 47/16
[52] U.S. Cl. ........................................ 55/260; 55/226; 55/230; 159/4 B; 159/4 S; 261/79 A; 261/88; 261/89; 261/118
[58] Field of Search ...................... 261/78 A, 79 A, 88, 261/96, 109, 89, 118; 55/226, 230, 260, 442–445, 459 R, 459 C; 159/4 R, 4 B, 4 S

[56] References Cited

U.S. PATENT DOCUMENTS

| | | |
|---|---|---|
| 1,961,956 | 6/1934 | Bleibtreu et al. ...................... 55/226 |
| 3,073,095 | 1/1963 | Hungate ................................ 55/230 |
| 3,112,239 | 11/1963 | Andermatt ........................... 159/4 B |
| 3,175,340 | 3/1965 | Schulze ....................... 261/79 A X |
| 3,596,885 | 8/1971 | Stone .................................. 55/260 X |
| 3,789,582 | 2/1974 | Graybill .......................... 55/260 X |
| 3,803,723 | 4/1974 | Lamm et al. .................... 159/4 B X |

FOREIGN PATENT DOCUMENTS

| | | | |
|---|---|---|---|
| 499847 | 3/1951 | Belgium ..................................... 55/260 |
| 70827 | 1/1970 | Fed. Rep. of Germany ............. 55/260 |
| 80661 | 3/1971 | Fed. Rep. of Germany ............. 55/260 |
| 1289817 | 2/1962 | France ....................................... 55/260 |
| 885376 | 12/1961 | United Kingdom . |
| 1070512 | 6/1967 | United Kingdom . |
| 1072176 | 6/1967 | United Kingdom . |
| 1088065 | 10/1967 | United Kingdom . |

*Primary Examiner*—Richard L. Chiesa
*Attorney, Agent, or Firm*—Sughrue, Rothwell, Mion, Zinn and Macpeak

[57] ABSTRACT

A processing gas is supplied to the atomizing zone around an atomizing device arranged centrally in an atomizing chamber through a conical guide duct communicating with a horizontal spiral duct through an annular mouth. A gas distribution incorporating a simple and accurate adjustment of the deflection of the gas stream from the spiral duct into the conical guide duct is obtained by means of two separate sets of stationary guide vanes arranged relatively close to and overlying each other in the mouth, one of said sets being constructed to deflect the gas stream stronger than the other set to a direction with a considerably smaller tangential velocity component, a damper being arranged along the mouth to be adjustable in the height direction for controlling the ratio of the portions of the gas stream in the spiral duct conducted into each of the two vane sets.

5 Claims, 3 Drawing Figures

GAS DISTRIBUTION DEVICE FOR THE SUPPLY OF A PROCESSING GAS WITH ADJUSTABLE FLOW DIRECTION TO AN ATOMIZING CHAMBER

Figure 2:
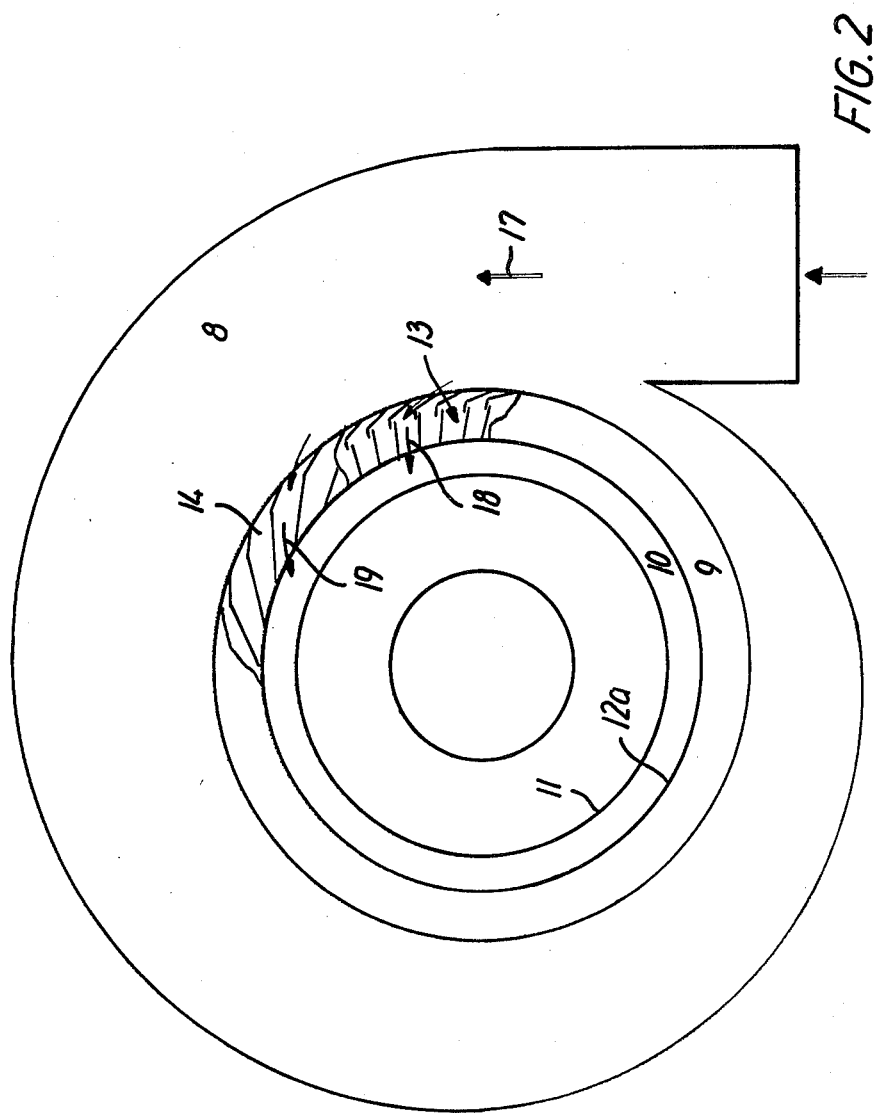
Figure 3:
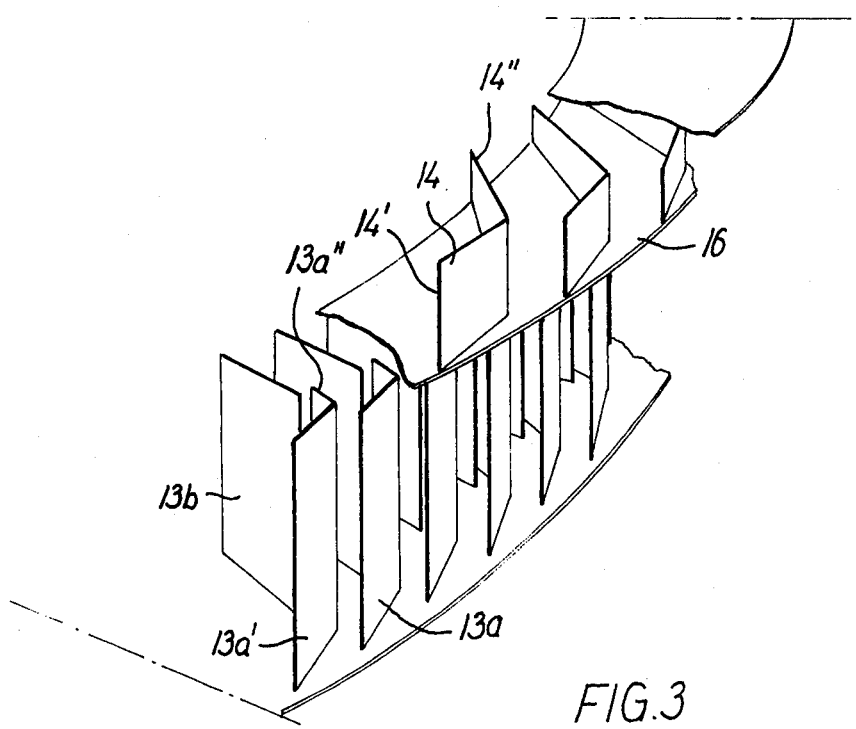

The invention relates to a gas distribution device for supplying a processing gas to an atomizing zone around an atomizing device arranged centrally in an atomizing chamber, said processing gas being conducted from a horizontal spiral supply duct through an annular mouth extending in rotational symmetry around the axis of the chamber into the space between two conical guide walls extending around and above the atomizing device, guide vanes being provided in said mouth for imparting a change of direction to the gas stream from a mainly purely tangential flow in the spiral duct into a rotating flow with a smaller tangential velocity component in the space between the conical guide walls.

By atomizing chambers is herein to be understood processing chambers for different processes, such as drying, cooling and absorption, in which a liquid which may be a homogenous substance, a solution or a suspension is atomized by means of an atomizing device such as a rotating atomizer wheel arranged centrally in the normally mainly cylindrical chamber.

The atomized material leaves the atomizing device in mainly horizontal radial directions out into an atomizing zone. In the processes in question, one or the other kind of a processing gas is most frequently supplied to this atomizing zone for achieving a desired result. In a drying process, for example, a heated drying gas which may be atmospheric air or an inactive gas may be supplied. In other processes, gases may be supplied which perform other physical or chemical reactions with the atomized material.

For obtaining a distribution of the supplied processing gas around the atomizing device which in respect of rotational symmetry is as uniform as possible, use is most frequently made of a distribution device of the above mentioned kind, in which the gas is conducted from the horizontal spiral supply duct which is positioned at a higher level than the atomizing device through said mouth into the conical duct formed by the space between the conical guide walls, the annular mouth of said conical duct being positioned in a horizontal plane immediately overlying the atomizing zone.

In the known constructions, a desired flow direction with a downwards movement is imparted to the amount of gas supplied to the conical duct by means of guide vanes in the conical duct. Furthermore, it is known to divide the conical duct by means of a further conical guide wall into two coaxial ducts for producing gas streams which are supplied to the atomizing zone with different flow directions, such as an internal gas stream with a mainly axial downward flow direction and an external spiral gas stream with a strong rotation around the axis of the chamber.

Thus, in a known construction, there is formed by an internal conical guide wall and two outer conical guide walls spaced differently from the internal guide wall and overlapping each other on a relatively small portion only, first a relatively wide conical duct communicating directly with the mouth and in continuation thereof inwards to the atomizing zone a conical duct having a smaller width. By means of adjustable guide vanes in the upper wide duct, a spiral gas stream is produced, a portion of which is released directly at the opening of the wide duct some distance above the atomizing zone, whereas another portion is conducted into the narrow conical duct and is directed by means of other guide vanes into an internal, substantially downward flow.

In another construction known from the specification of DDR (German Democratic Republic) Pat. No. 70,827, the conical duct is formed bipartite throughout the extension from the mouth at the spiral duct to the opening in the interior of the chamber above the atomizing zone, and in each of the two duct portions, guide vane sets are arranged which are individually adjustable to a desired change of direction for producing two gas streams as mentioned above.

The known instructions have in common that, in particular, the adjustment of the guide vane set producing the spiral gas stream has appeared to be relatively critical and is, furthermore, troublesome to perform in practice, because the guide vanes are arranged in the interior of the conical duct between the conical guide walls and are only accessible by direct intervention in the atomizing chamber. Since the adjustment must be experimentally performed for the actual installation and with a consideration to the character of the feed material, the desired character of the final product and the operational parameters of the process to be performed, such as adjustment is very time-consuming and laborious.

It is the object of the invention to provide a gas distribution device which by simple means allows a simple and accurate adjustment of the deflection of the gas stream from the spiral duct into the conical guide duct caused by vane sets of the kind mentioned.

In order to achieve this, a gas distribution device according to the invention is characterized in that the vanes comprise two separate sets of stationary vanes positioned relatively close to and overlying each other in the mouth, one of said sets being shaped to deflect the gas stream stronger to a direction with a considerably lower tangential velocity component than the other set, a damper being arranged along the mouth to be adjustable in the height direction for controlling the ratio of the portions of the gas stream in the spiral duct conducted into each of the two vane sets.

Thereby, the troublesome and time-consuming adjustment by turning the guide vanes themselves is replaced by a simple height displacement of said damper, which can be performed from the outside without any difficulty and by which the mixing ratio of the portion of the processing gas subjected to a strong change of direction in the mouth and the portion allowed to pass more freely from the spiral duct to the conical duct is changed. Since it has appeared that mixing of the gas streams having passed the two vane sets occurs immediately inwards of the two guide vane sets in the upper portion of the conical duct, a spiral gas stream having a desired ratio of a radial downward and a tangential velocity component in a desired variation range may be obtained in a simple manner.

If, as mentioned above, two separate gas streams through the atomizing zone are to be produced, a further change of direction, for example to a substantially axially downward gas stream, may be imparted to a portion of the gas stream thus produced in a separate continuation of the conical duct in a known manner, whereas the remaining portion of the gas stream is conducted directly out into the atomizing chamber.

In the following, the invention will be explained in further details with reference to the accompanying drawings, in which FIG. 1 is a simplified vertical sectional view of an embodiment of a gas distribution device according to the invention, FIG. 2 is a horizontal sectional view along the line II—II in FIG. 1, and FIG. 3 is a perspective view for illustrating the guide vanes in the embodiment shown in FIGS. 1 and 2.

In FIGS. 1 and 2 a rotating atomizing device, such as an atomizer wheel, is shown at 1, which device is presupposed to be arranged centrally in the upper part of an atomizing chamber, of which only the underside of the chamber ceiling is indicated at 2.

The atomizing device 1 is positioned at the bottom of a conical skirt 3 surrounding the lower part of drive means, not shown, for the atomizing device, and through which the liquid to be atomized is supplied in the form of homogenous substance, a solution or a suspension in a manner not further illustrated.

To the atomizing zone of the chamber which is situated radially around the atomizing device 1, there shall be supplied by means of a gas distribution device according to the invention a processing gas adapted to the process, such as drying, cooling or absorption, to which the supplied material is to be subjected after atomization by means of the atomizing device 1. In a drying process, the processing gas may consist, for example, of heated atmospheric air.

In many cases, the processing gas is caused to pass through the atomizing chamber in two separate streams, i.e. an internal stream supplied to the atomizing zone from above with a strong downwards directed movement, as shown by arrows 4 and 5, and an external stream carried through the chamber at a greater distance from the atomizing device 1, as shown by arrows 6 and 7, and with a strong rotational component.

The processing gas is supplied from a fan device, not shown, through a spiral supply duct 8 arranged above the ceiling 2 of the atomizing chamber, said supply duct communicating through an endless annular mouth 9 with a conical guide duct 10. This guide duct 10 is restricted to one side by an internal conical guide wall 11, the lower end of which is connected to the skirt 3 and, in the example illustrated, in which two separate streams of processing gas are to be produced, the duct 10 is divided, by means of two external conical guide walls 12a and 12b spaced differently from the guide wall 11 and overlapping each other on a small portion only at the underside of the chamber ceiling 2, into an external duct 10a opening at the underside of the chamber ceiling 2 for producing the above mentioned external stream of processing gas, and an internal duct 10b, to which only a part of the amount of gas passing through the duct 10a is supplied and which opens some distance below the underside of the chamber ceiling 2 for producing the above mentioned internal stream of processing gas.

In known gas distribution devices, the flow direction for each of these two streams are determined by guide vanes arranged directly in the ducts 10a and 10b, of which at least the guide vanes in the outer duct 10a must be adjustable to allow adaption of the external spiral stream of processing gas to the process to be carried out and the material to be processed in the atomizing chamber.

In order to avoid this practically difficult and time-consuming adjustment requiring direct intervention into the atomizing chamber, the flow direction in the outer conical guide duct 10a is determined in contradistinction thereto, in the gas distribution device according to the invention, by a simple mixing principle, since in the mouth 9 two separate sets of stationary guide vanes 13 and 14 are positioned relatively close to and overlying each other, one of which set 13 deflects the gas stream stronger to a direction with a considerably smaller tangential velocity component than the other set 14, a damper 15 being arranged along the mouth 9 to be adjustable in the height direction for controlling the ratio of the portions of the gas stream in the spiral duct 8 conducted into each of the two guide vane sets 13 and 14, respectively, which are separated in the mouth 9 by an annular horizontal separating plate 16. Thereby, the two guide vane sets form together distance members in the mouth 9, so that separate stay or support means therein may be dispensed with.

Among the two guide vane sets, the guide vane set 13 is constructed to impart a strong deflection to the gas stream in the spiral duct 8 having a purely tangential flow direction, as shown by an arrow 17, so that the gas streams passing through the vanes of the vane set 13 enter into the conical guide duct under a relatively small angle to axial planes in the gas distribution device, such as shown by an arrow 18.

On the contrary, the vane set 14 imparts a less strong deflection to the gas streams supplied from the duct 8, so that the gas stream from this vane set inters into the conical duct, as shown by an arrow 19, while maintaining such a great tangential velocity component that there is preferably a substantially free flow of gas from the duct 8 through the vane set 14 into the duct 10.

Since it has appeared that mixing of the gas streams having flow directions as shown by arrows 18 and 19 occurs immediately inwards of the vane sets 13 and 14 in the duct 10, adjustment of the flow in the upper portion 10a of the conical guide duct 10 may thus take place by lifting and lowering the mixing damper 15, shown only in FIG. 1, which in the embodiment shown is arranged in the spiral duct 8 on the external side of the mouth 9 and may be operated from the outside by means of a pulling rod 20, to any flow direction in a variation range, the outer limits of which are determined on one hand by the outlet flow directions from the vane sets 13 and 14, shown by the arrows 18 and 19, and, on the other hand, by the ratio of the extensions of the two vane sets in the height direction of the mouth 9 and, furthermore, by the range of displacement of the height adjustable damper 15.

In order to obtain the above mentioned internal stream of processing gas, guide vanes 21 may be arranged in the duct 10b to act upon the gas stream passing through this duct. These guide vanes 21 may normally be stationary.

In order to obtain a variation range suitable in practice, the vane sets 13 and 14 may be shaped such that the outlet flow directions shown by the arrows 18 and 19 form angles of about 15° and about 45°, respectively, with axial planes in the gas distribution device, and the height of the vane set 13 should preferably be greater than the height of the vane set 14, so that the height of the vane set 13 amounts, for example, to two thirds of the height of the mouth 9. With a range of movement of the mixing damper 15 ranging from complete closure for the vane set 14 to complete opening for this vane set and half closure for the vane set 13, a variation range for the flow direction in the upper conical guide duct of about 15° may be obtained, i.e. between resulting flow directions forming angles of about 15° and about 30° with axial planes in the gas distribution device, which has appeared suitable in practice.

However, these numerical values are not limiting to the invention, since the construction and the height of the vane sets 13 and 14 as well as the displacement range of the damper 15 may deviate from the above mentioned values.

In the embodiment shown, the guide vane set 14 allowing a substantially free flow from the spiral duct 8 to the conical duct 10 is arranged uppermost in the mouth 9. However, in principle, nothing could prevent this vane set from being arranged lowermost, although it should normally be preferred due to the conical guide wall 11 to have the flow with a great tangential velocity component uppermost.

For obtaining an optimum and, with respect to rotational symmetry, uniform distribution of the processing gas conducted from the spiral-supplied duct 8 into the conical guide duct 10, at least the vane set 13 may consist of two succeeding sets of stationary guide vanes **13*a* and 13*b*, respectively, such as described in the applicant's Danish Patent Application No. 3640/78, in which the vanes in one vane set 13*a* positioned at the opening of the mouth 9 towards the spiral duct 8 are shaped to deflect the gas stream from the purely tangential flow shown by an arrow 17 in the duct 8 to a flow direction shown by arrows 18, for which the radial velocity component inwards to the axis of the gas distribution device considerably exceeds the tangential velocity component, whereas each of the vanes in the other vane set 13*b* at the internal opening of the mouth 9 towards the conical guide duct 10** projects into the space between the internal portions of neighbouring vanes in the first vane set and extends substantially parallel to tangential planes to these vanes at their internal edges, i.e. parallel to the direction to which the gas stream has been deflected by these neighbouring vanes.

Each of the vanes **13*a* may, as shown, have a bend form composed of two substantially plane portions 13*a*' and 13*a*'', but these vanes may also have a more uniformly curved cross sectional shape which can provide the desired deflection of the gas stream from the duct 8. The vanes 13*b* are shown as flat guide vanes, but should only extend substantially parallel to the vane parts 13*a*'', so as to stabilize the gas streams to the directions, to which they have been deflected by the vanes 13*a***.

In the embodiment shown, in which the vane set 14 is constructed to allow substantially free flow, the vanes of this vane set may in the same manner as the vanes **13*a* in the vane set 13 have a simple bend form composed of two substantially flat vane portions 14' and 14''. If the vane set 14 is constructed for a stronger deflection of the gas stream, also this vane set may as the vane set 13** advantageously be composed of two succeeding vane sets in order to obtain a good distributing and directional guiding effect.

The detailed construction of the vane sets 13 and 14 may be as shown in the perspective view in FIG. 3. In order to obtain a good gas distribution and directional guiding effect, it is essential that the vanes in both vane sets are positioned at a small angular spacing in the mouth 9, preferably such that the spacing of neighbouring vanes is smaller than the radial extension of the mouth 9 between the internal opening of the duct 8 and the inlet opening to the conical guide duct 10.

The vanes may be manufactured by simple stamping and folding or bending of vane members of a plate material, such as steel, which is resistant to the possible corroding influences from the processing gas.

What is claimed is:

1. A gas distribution device for supplying a processing gas to an atomizing zone around an atomizing device arranged centrally in an atomizing chamber, comprising a horizontal spiral supply duct for said processing gas, said duct having an annular mouth extending in rotational symmetry around the axis of the chamber, and two conical guide walls extending around and above the atomizing device, said guide walls limiting a space communicating with said mouth, guide vanes being provided in said mouth for imparting a change of direction to the gas stream from a mainly purely tangential flow in the spiral duct into a rotating flow with a smaller tangential velocity component in the space between the conical guide walls, wherein the improvement comprises two separate sets of stationary vanes positioned relatively close to and overlying each other in the mouth, one of said sets being shaped to deflect the gas stream stronger to a direction with a considerably lower tangential velocity component than the other set and a damper being arranged along the mouth to be adjustable in the height direction for controlling the ratio of the portions of the gas stream in the spiral duct conducted into each of the two vane sets.

2. A gas distribution device as claimed in claim 1, wherein said one vane set is positioned underneath in the mouth, and that the height of the vanes in this vane set exceeds half of the height of the mouth.

3. A gas distribution device as claimed in claim 1, wherein the vanes in said other vane set is shaped to allow a substantially free flow of gas from the spiral duct into the space between the conical guide walls.

4. A gas distribution device as claimed in claim 1, wherein said damper is arranged at the external opening of the mouth towards the spiral duct.

5. A gas distribution device as claimed in claim 1, wherein the two vane sets are separated by an annular horizontal separating plate.

* * * * *